US008065604B2

(12) United States Patent
Blankinship

(10) Patent No.: US 8,065,604 B2
(45) Date of Patent: Nov. 22, 2011

(54) TECHNIQUES FOR RELATING ARBITRARY METADATA TO MEDIA FILES

(75) Inventor: Erik Jackson Blankinship, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1442 days.

(21) Appl. No.: 11/027,117

(22) Filed: Dec. 30, 2004

(65) Prior Publication Data
US 2006/0149781 A1    Jul. 6, 2006

(51) Int. Cl.
*G06F 17/00*    (2006.01)
(52) U.S. Cl. ....................................................... 715/229
(58) Field of Classification Search .................. 715/201, 715/200, 229, 230
See application file for complete search history.

(56) References Cited

U.S. PATENT DOCUMENTS

| | | | |
|---|---|---|---|
| 5,892,536 A | 4/1999 | Logan et al. | |
| 6,665,659 B1 | 12/2003 | Logan | |
| 6,782,394 B1 * | 8/2004 | Landeck et al. | 707/104.1 |
| 7,073,193 B2 * | 7/2006 | Marsh | 725/114 |
| 7,082,162 B2 * | 7/2006 | Prakash et al. | 375/240.08 |
| 7,210,100 B2 * | 4/2007 | Berger et al. | 715/229 |
| 7,260,773 B2 * | 8/2007 | Zernik | 715/229 |
| 7,281,260 B2 * | 10/2007 | Puente et al. | 725/110 |
| 7,650,572 B2 * | 1/2010 | Olander et al. | 715/762 |
| 7,689,578 B2 * | 3/2010 | Albornoz et al. | 715/230 |
| 2002/0120925 A1 * | 8/2002 | Logan | 725/9 |
| 2003/0030752 A1 * | 2/2003 | Begeja et al. | 348/563 |
| 2003/0126214 A1 * | 7/2003 | Oliszewski | 709/206 |
| 2004/0093564 A1 * | 5/2004 | Kumhyr et al. | 715/526 |
| 2004/0199547 A1 * | 10/2004 | Winter et al. | 707/200 |
| 2004/0230892 A1 * | 11/2004 | Horton | 715/511 |
| 2005/0021502 A1 * | 1/2005 | Chen et al. | 707/2 |
| 2005/0138540 A1 * | 6/2005 | Baltus et al. | 715/511 |
| 2005/0262432 A1 * | 11/2005 | Wagner | 715/511 |
| 2005/0268221 A1 * | 12/2005 | Shur et al. | 715/513 |
| 2007/0130007 A1 * | 6/2007 | Haberman et al. | 705/14 |
| 2007/0168413 A1 * | 7/2007 | Barletta et al. | 709/203 |
| 2007/0192192 A1 * | 8/2007 | Haberman et al. | 705/14 |

OTHER PUBLICATIONS

Turcato et al.,"Pre-processing Closed Captions for Machine Translation", 2000, Association for Computational Linguistics pp. 38-45.*
Li et al., "Creating MAGIC: System for Generating Learning Object Metadata for Instructional Content", ACM, 2005, pp. 367-370.*
Pfoser et al."Metadata Modeling in a Global Computing Environment", ACM, 2002, pp. 68-73.*
Davis et al., Generalizing Operational Transformation to the Standard General markup Language, ACM, 2002, pp. 58-67.*

(Continued)

*Primary Examiner* — Laurie Ries

(57) ABSTRACT

A metadata text file is used to make media files searchable and rearrangeable. The metadata file includes a sequence of relaters that relate items of metadata to segments of media files. The metadata file can be searched for an item of metadata and the item's relater used to locate the corresponding media file segment, or be used to "play" the metadata files by displaying segments in an order depending on the order of the relaters. New combinations of media file segments may be made by adding, deleting, or reordering the relaters in the metadata text file. The metadata file is used to relate metadata to media files in systems for making fan vids, for comparing the text of a book with a movie, or that use temperature readings from pots being used to cook a recipe to locate sections of a cooking video.

35 Claims, 14 Drawing Sheets

OTHER PUBLICATIONS

S. Pfeiffer, C. Parker, A. Pang, CSIRO, "draft-pfeiffer-temporal-fragments-02.txt" Network Working Group Internet Draft, Dec. 31, 2003.

Ann Oldenburg, "Clean Flicks cuts right to the chase", USA TODAY. com Mar. 24, 2005.
http://www.shadowtv.com/index2.html.

* cited by examiner

```
103    <?xml version='1.0' encoding='UTF-8'?>
105  — <EPISODE mov='101.mov'>
       — <clip num='0'>                                111
            <source line='Space, the final frontier.'
107         tc='00:00:20.11' tcout='00:00:25.25'/>
      117 <mods />         113              115
          </clip>
       — <clip num='1'>
            <source line='These are the voyages of the
              Starship Enterprise.'
            tc='00:00:25.25' tcout='00:00:29.20' />
          <mods />
          </clip>
       — <clip num='2'>
            <source line='Its continuing mission...
              'tc=00:00:29.21' tcout='00:00:31.20'/>
          <mods />
          </clip>

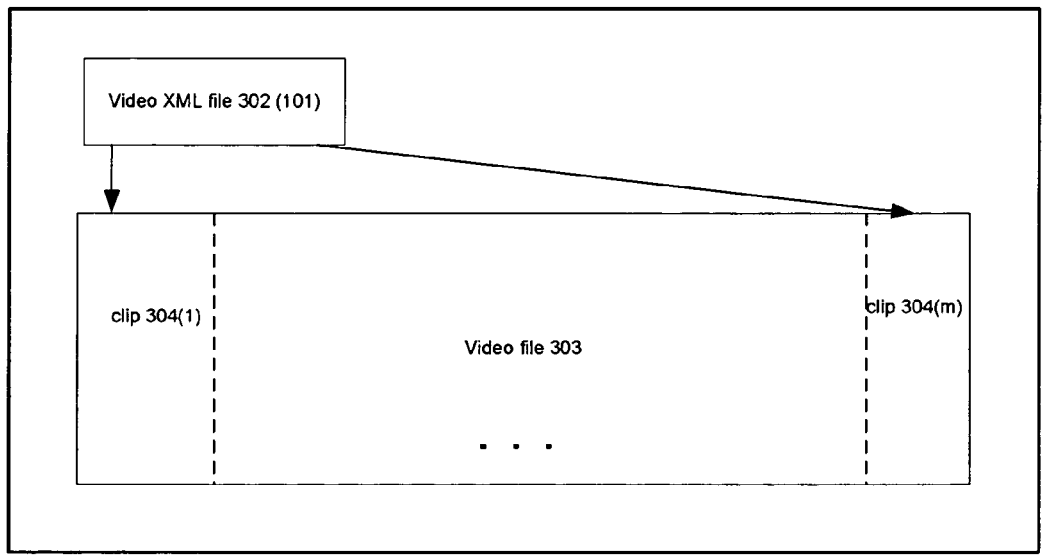
video folder 301
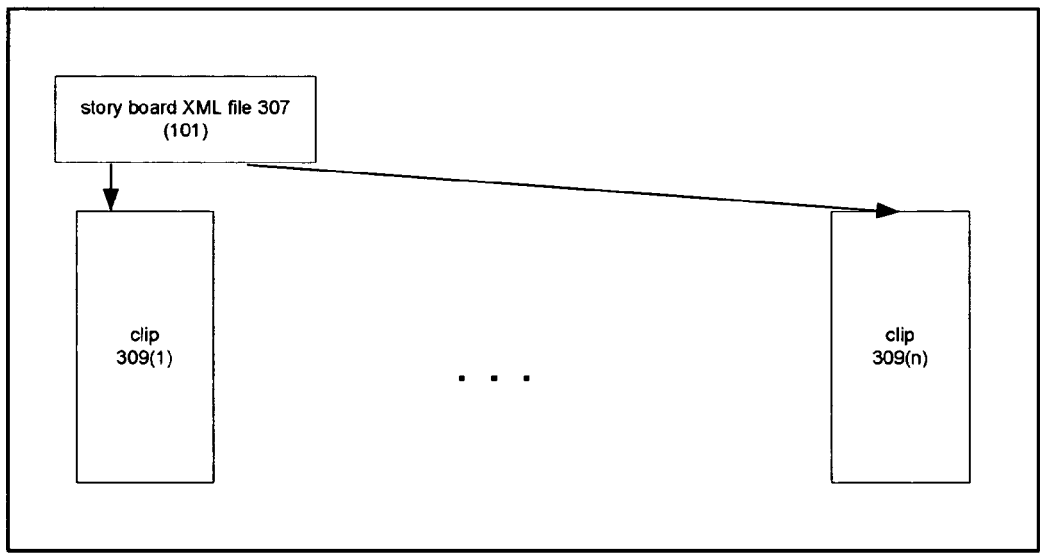
story board folder 305
Fig. 3

```
1003  <?xml version="1.0" encoding="UTF-8" ?>
1006  <BOOK PAGES="347" TITLE="The Fellowship of the Ring">
1008    <CHAPTER NUMBER="1" TITLE="A Long-expected Party">
        When Mr. Bilbo Baggins of Bag End announced that he would shortly
        be celebrating his eleventy-first birthday with a
        party of special magnificence,
        . . .
        The purchase of provisions fell almost to nothing throughout the
        district in the ensuing weeks; but as Bilbo's catering had depleted
        the
        stocks of most stores, cellars and warehouses for miles around,
        that did not matter much.
        After the feast (more or less) came the Speech.
                 1011            1013
1010    <anchor tcin="00:17:42,14" tcout="00:17:47,20">
        Most of the company were, however, now in a tolerant mood, at
        that
        delightful stage which they called 'filling up the corners'.
        They were sipping their favourite drinks, and nibbling at their
        favourite dainties, and their fears were forgotten.
        They were prepared to listen to anything, and to cheer at every
        full stop.
        My dear People, began Bilbo, rising in his place. 'Hear! Hear!
        Hear!'
        they shouted, and kept on repeating it in chorus, seeming
        reluctant to.follow their own advice. Bilbo left his place and
        went and stood on a chair under the illuminated tree.
        </anchor>

<anchor tcin="00:17:52,24" tcout="00:18:17,09">
        The light of the lanterns fell on his beaming face; the golden
        buttons shone on his embroidered silk waistcoat.
        . . .
        This was the sort of stuff they liked: short and obvious.
        </anchor>

. . .

<anchor tcin="00:14:01,00" tcout="00:14:28,11">
        'I am old, Gandalf. I don't look it, but I am beginning to feel
        it in my heart of hearts. Well preserved indeed!' he snorted.
        'Why, I feel all thin, sort of stretched, if you know what I
        mean: like butter that has been scraped over too much bread.
        That can't be right. I need a change, or.something.'
        </anchor>

Gandalf looked curiously and closely at him.
        . . .
        Frodo did not see him again for a long time
      </CHAPTER>
        . . .

</BOOK>
```

Fig. 10

```
<TITLE="cooking show">

<SENSOR type="thermometer">
        <item temp="44.01" seconds="360.0"/>
        <item temp="44.01" seconds="891.0"/>
        <item temp="44.01" seconds="1442.0"/>
        <item temp="44.01" seconds="1952.0"/>
        <item temp="46.21" seconds="2493.0"/>
        <item temp="44.01" seconds="3034.0"/>
        <item temp="48.91" seconds="3575.0"/>
        <item temp="54.11" seconds="4086.0"/>
        <item temp="58.51" seconds="4636.0"/>
        <item temp="68.09" seconds="5147.0"/>
        <item temp="75.81" seconds="5678.0"/>
        <item temp="85.01" seconds="6209.0"/>
        <item temp="90.44" seconds="6749.0"/>
        <item temp="95.71" seconds="7280.0"/>
        <item temp="100.94" seconds="7851.0"/>
        <item temp="105.01" seconds="8362.0"/>
    </SENSOR>

<SENSOR type="humidity sensor">
        <item value="22" seconds="130.0"/>
        <item value="22" seconds="621.0"/>
        <item value="22" seconds="1151.0"/>
        <item value="22" seconds="1682.0"/>
        <item value="22" seconds="2223.0"/>
        <item value="22" seconds="2754.0"/>
        <item value="23" seconds="3284.0"/>
        <item value="41" seconds="3815.0"/>
        <item value="44" seconds="4346.0"/>
        <item value="47" seconds="4887.0"/>
        <item value="48" seconds="5417.0"/>
        <item value="55" seconds="5948.0"/>
        <item value="55" seconds="6479.0"/>
        <item value="55" seconds="7010.0"/>
        <item value="55" seconds="7541.0"/>
        <item value="55" seconds="8081.0"/>
        <item value="55" seconds="8612.0"/>
    </SENSOR>

</TITLE>
```

Fig. 11

```xml
- <EPISODE>
   - <clip num="0">
       <source line="Space, the final frontier." tc="00:02:47.24"
       tcout="00:02:52.05" source="remote_server/181.mov"/>
       <mods/>
     </clip>                                              — 1303
   - <clip num="1">
       <source line="These are the voyages of the Starship Enterprise."
       tc="00:02:52.07" tcout="00:02:56.02"
       source="remote_server/181.mov"/>
       <mods/>
     </clip>
   - <clip num="2">
       <source line="Its continuing mission..." tc="00:02:56.04"
       tcout="00:02:58.03" source="remote_server/181.mov"/>
       <mods/>
     </clip>
  </EPISODE>
```

TECHNIQUES FOR RELATING ARBITRARY METADATA TO MEDIA FILES

CROSS REFERENCES TO RELATED APPLICATIONS

Background of the Invention

1. Field of the invention

The invention relates generally to relating metadata to media objects and more particularly to techniques that employ text metadata objects to relate arbitrary metadata to portions of objects 2. Description of related art Metadata and Its Uses Metadata is data about other data. Examples of metadata in printed works are page numbers, chapter divisions, tables of contents, and indexes. In a video file, the metadata may include textual descriptions of the video file's dialog and images. U.S. published patent application 2002/0120925, James D. Logan, Audio and video program recording, editing, and playback systems using metadata, which is a CIP of U.S. Ser. No. 09/536,696, filed Mar. 28, 2000, describes how metadata can be created, associated with programming segments, and used to selectively record and play back desired programming (Abstract). The reference further describes at paragraph 0628 how program segments may be saved in a virtual scrapbook and edited there to delete or crop segments and rearrange the sequence in which they are played back. The reference does not, however, disclose any particular representation of metadata.

The Importance of Metadata Representations

The importance of how metadata is represented can be seen by comparing the ease with which the displays that appear on Web pages may be edited with the difficulties involved in editing files that contain digital representations of images, audio, or video. Such files will be termed in the following media files. Web displays are complex entities that can even include media files, but Web displays are produced by executing text files written in HTML, and thus can be edited simply by editing the HTML. Since the HTML is contained in a text file, all of the tools that are available for editing text are available for editing HTML. For example, FIND and REPLACE functions work with HTML files, as do CUT and PASTE.

Because there is no equivalent of HTML in media files, manipulating them is much more difficult than manipulating Web pages. An example of the difficulties involved in such manipulation is so-called "fan vids", that is videos made by cutting scenes from preexisting videos of popular shows and using the scenes to make new videos consisting of interesting juxtapositions of scenes from the shows, often set to popular music. Originally, these were made by connecting the video output from one consumer VCR to the video input on another VCR. Screenings of such "fan vids" took place at science-fiction conventions, where other fans learned the procedure. The art of fan viding spread in this fashion, and it remains popular today. A well-crafted fan vid juxtaposes video clips with relevant song lyrics and thereby creates a novel interpretation of the television show's canon. For example, a well produced Star Trek fan vid juxtaposes video clips of Kirk and Spock gazing into the distance cued to the lyrics of a romantic ballad, thereby suggesting romance between these characters. To find the video clips needed for a fan vid, the fan had to have an exhaustive knowledge of the television show; indeed, some fans produced "clip notes", which are listings of approximate times at which memorable events in certain episodes of the show occur. Other fans then used these clip notes to produce their own fan vids. While making fan vids has gotten easier with the advent of digitized representations of videos and of contemporary digital editing software, it still remains more difficult than editing Web pages.

Closed Captions and Their Uses

Textual metadata for a video file may include closed captions and subtitles. Subtitles are simply the text of a film's dialog. Closed captions include other material, such as descriptions of sound effects. In the following discussion, the term closed captions will be understood to include subtitles. Many video files provide for the display closed of captions at the bottom of the screen while a scene is playing. The closed captions are in the language of the dialog or in a different language. The closed captions are provided primarily for those with hearing difficulties, but they are also useful for those who read the language of the dialog but cannot understand the spoken language. Because the closed captions are textual, the tools that are available for handling text can be used with the closed captions. That fact has been taken advantage of in a number of ways: One early project that used computational search of television was Network Plus, which augmented televised news broadcasts with contextual information from the Associated Press news wire. Keywords extracted from the closed-caption data were used to retrieve relevant information from external databases, such as the wire services, and this information was presented as a synchronous overlay to the broadcast program using the closed captioning as a time code. Another project, Auto Cassette, parsed the closed captioning from evening news broadcasts to automatically segment news stories and create a table of contents of the broadcast. Titles for the news stories were extracted from the closed caption for the first sentence following the newscaster's introduction.

Two current consumer devices use closed captions to prevent the display of subtitled dialogue: Curse-Free TV™ and TVGuardian™ scan closed captions for profanity and both silence corresponding offensive audio and present alternate subtitles. Some personal-computer video-capture cards also scan closed captions, and have bundled software that can alert users when key words are spotted or can create transcripts of the closed captions (without time code). Consumer devices generally treat closed captions as just another track that can be turned on or off like the audio or video tracks.

What none of the related art provides is a technique which makes media files rearrangeable and searchable to the same degree that the HTML for a Web page can be used to rearrange and search the Web page. It is an object of the invention disclosed herein to provide such a technique. The technique may be used to make fan vids, to relate an adaptation to an original, and generally to relate arbitrary metadata to portions of objects.

SUMMARY OF THE INVENTION

The object of the invention is attained by means of a text object that relates metadata to segments of one or more other objects. The text object and the other objects are stored in memory accessible to a processor and the text object is used by the processor to manipulate the segments. The text object includes a sequence of relaters that relate metadata to segments. Each relater includes a segment specifier for a segment and the metadata that is related to the segment.

The processor can use the text object to locate the segment by searching the text object for a particular item of metadata and using the segment specifier in the relater that contains the item of metadata to locate and can then display the segment.

The processor can also employ the text object to display the segments in the order specified by the order of the relaters in the sequence and can rearrange the order in which the segments are displayed by rearranging the order of the relaters in the sequence. The one or more other objects may be accessible to the processor via a network and may be stored on servers in the network.

In a particularly interesting variant of the invention, the other objects are media objects and the segment specifier specifies an in point and an out point in one of the media objects. In one version of this variant, the metadata in the relater may be a piece of closed caption that corresponds to dialog in a segment of the media object. In another version, the metadata may be a portion of a text that is related to the media object, for example a story of which the media object contains an adaptation.

In another interesting variant, a set of values are related to the segments, the metadata in the relater is a value belonging to the set, and the segment specifier specifies the segment that is related to the value. In this version, the segments may relate to stages in a process that is monitored by instruments and the values are values that may be recorded by the instruments.

In a further interesting variant, there are at least two of the other objects, the segment specifier specifies a segment in one of the other objects, and the metadata includes another segment specifier that specifies a segment in a second of the other objects. In this arrangement, the segment in the second object is metadata with regard to the segment in the first object. This arrangement can be used to compare objects that are versions of the same work, for example, a stage version of a musical and the movie version.

The text object can be used to construct apparatus for displaying sequences of segments of objects stored in memory. The apparatus includes the text object and a text object interpreter that has access to the text object, to the objects, and to a display device. The text object interpreter displays the segments in the display device in the order in which the segment specifiers occur in the sequence. The text object interpreter may further include a text object editor that has access to the text object and the alters the sequence of segment specifiers in response to inputs from a user, as well as a search component that the user can employ to locate a metadata item in the text object. When the user has located the metadata item, the text object interpreter responds by displaying the segment specified in the segment specifier corresponding to the metadata item.

The text object can also be used to construct apparatus for displaying segments of objects stored in memory. The apparatus includes the text object and a segment finder that has access to the text object and the objects and to a display device. The segment finder locates a relater for a metadata item and displays the segment associated with the relater. The segment finder may receive a search value and apply the search value to the metadata items to locate the relater. The segment finder may also respond to a metadata item selection input by displaying a selected metadata item together with its associated segment in the display device. A user may make the metadata selection input by selecting a relater from a representation of the sequence of relaters in the display. The representation of the sequence of relaters may be a line in which a position in the line corresponds to a relater in the sequence. The apparatus for displaying segments of objects may be used to display segments from different versions of a work.

Other objects and advantages will be apparent to those skilled in the arts to which the invention pertains upon perusal of the following Detailed Description and drawing, wherein:

BRIEF DESCRIPTION OF THE DRAWING

FIG. 1 shows a metadata text file that is produced when closed captions are used to segment a video file;

FIG. 3 shows how the XML code is associated with a video file or with a set of video clips;

FIG. 10 is a detail of one embodiment of the metadata text file of FIG. 6

FIG. 11 is a detail of a metadata text file used to associate temperature and humidity data with a video;

FIG. 13 shows a metadata text file in which the clip construct refers to a video that is stored in a server.

Figure 2:
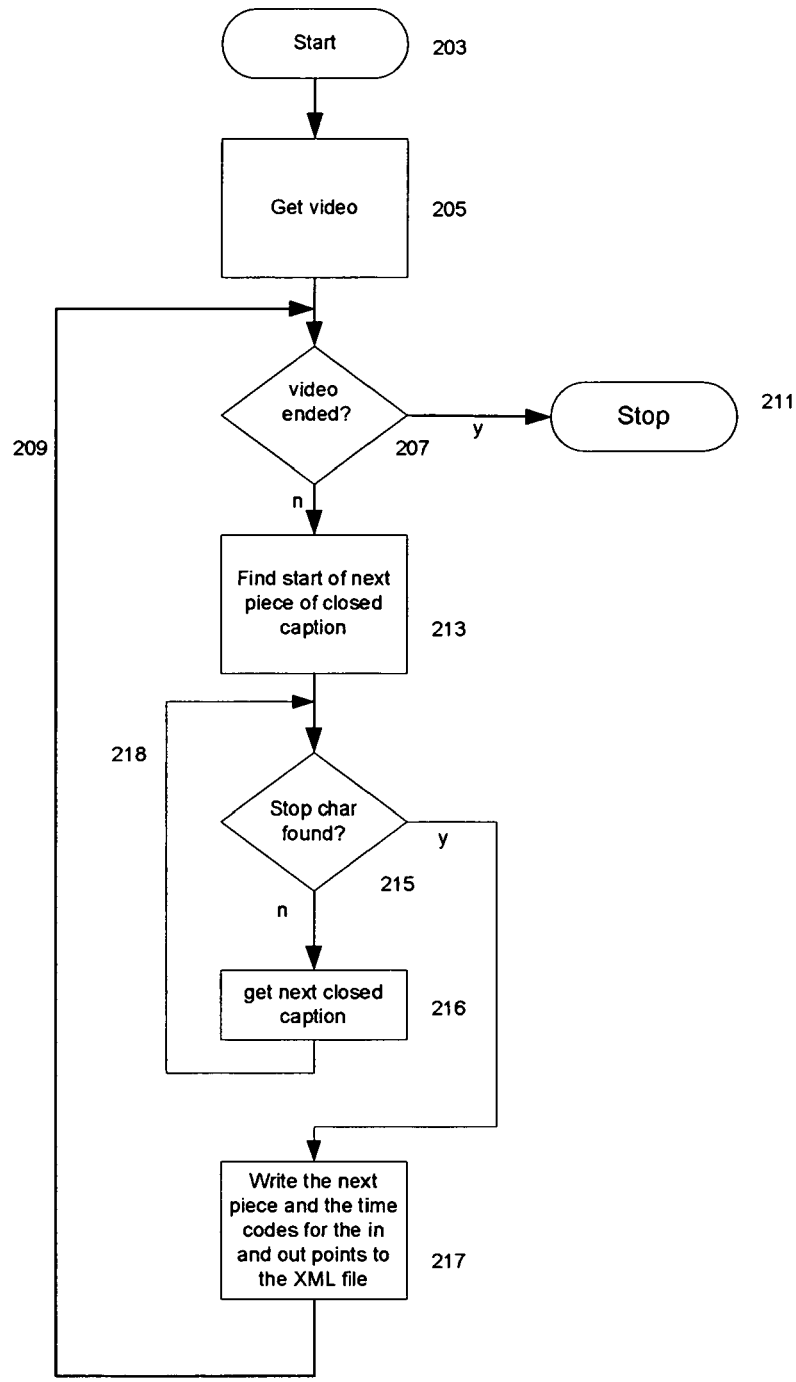
FIG. 2 is a flowchart of how the XML code of FIG. 1 is produced.

Reference numbers in the drawing have three or more digits: the two right-hand digits are reference numbers in the drawing indicated by the remaining digits. Thus, an item with the reference number 203 first appears as item 203 in FIG. 2.

DETAILED DESRIPTION

The following Detailed Description will first provide an overview of the technique for relating metadata to media files and will then provide three examples of its use:

in a graphic editor called TalkTV which uses closed captions to segment video files, permits users to search for segments having particular words in their closed captions, and then to reorder the segments;

in a technique for relating versions of a work to each other, for example relating a book to a movie made from the book; and in a technique for finding segments in a video file in response to inputs such as temperature.

Overview: FIGS. 1, 3, and 13

In broadest terms, what the invention does is associate a text file containing metadata with one or more media files. The metadata text file in turn associates metadata recorded in the text file with segments of the media files. All of the usual searching and editing techniques available for text files can be used with the metadata text file and the metadata text file can be used to access the media files and to control which segments of the media files will be displayed and the order in which those segments will be displayed. In a preferred embodiment, the metadata text file is a file in the well-known extended markup language, or XML. FIG. 3 shows two examples of associations between an XML file and video files. In both cases, the association is made by including the XML file (302,307) with a folder containing video files. Of course, any other technique may be used for associating the metadata text file with the media file(s); for example, the metadata text file may be associated with a single media file by placing it in the header of the media file or by providing it as an additional track in the media file. The association between the XML file and segments of media files may also be made by the manner in which the XML file refers to the segments. If the XML file uses URL-based addresses, for example, the media files may be on any server to which the system reading the XML file has access. This is shown in FIG. 13, where XML file 1301 has clip constructs which include a source construct 1303 which specifies a file located on a remote server as the source of the clip specified by the in and out points.

XML file 302 merely relates segments 304 of video file 303 to metadata contained in the XML file; to find a segment that corresponds to a certain item of metadata, one searches the XML file for the metadata and uses the information in the XML file to locate the corresponding segment in video file 303. The arrangement shown at 301 can thus be used to make video file 303 searchable with regard to a certain kind of metadata. XML file 307 can further be used to play the clips and when XML file 307 is played from beginning to end, it is the order of the metadata in XML file 307 that determines the order in which the clips will be played. Of course, the clips can also be combined into a single new media file and XML file 307 will then stand in the same relationship to the new media file as XML file 302 does.

FIG. 1 shows an example metadata text file 101 written in the XML language. What is shown in FIG. 1 is a portion of a video XML file 302. XML file 302 relates segments of a video identified at 105 to metadata consisting of pieces of the video's closed captions. How XML file portion 101 is made will be explained in detail later; here it is only necessary to know that the XML construct <clip . . . >. . . </clip>, indicated in the figure by the reference number 107, relates the piece of the closed caption at 111 to the segment of the video defined by the in time at 113 and the out time at 115. The clip structure is an example of what is termed in the following a relater, that is, a structure in the metadata text file that relates an item of metadata to a segment of a media file.

There is a clip construct for each piece of closed caption in the video and a segment can be found by searching the XML file for a word in the segment's closed caption. The segments identified by the clip construct can further be rearranged simply by reordering the clip constructs in the XML metadata file. In XML file 101, the segments referred to by the clip constructs are all from the video indicated by 101.mov and that video is in the same directory as XML file 101, and consequently, all that is needed to identify the segment is a clip number; in other embodiments, a segment may be identified in a clip construct by an identifier for the media file as well as a clip number, and the identifier may be a URL for the media file, as shown in FIG. 13.

As will be apparent from the foregoing discussion, XML files like XML file 101 may be made for any metadata which can be related to a segment of a media file; an example of the use of temperature as metadata will be given later. An advantage of using XML for the metadata file is that XML is in fact a programming language. It permits transfer of control to a clip in response to an outside event such as the ringing of a telephone as well as in response to branches that occur in the course of the execution of a program. It should also be pointed out here that while XML offers a particularly useful way of writing the metadata text file, any form of text file can be used. All that is necessary is that the file relates terms to be searched for to segments of the video. Moreover, because the metadata file is a text file, it can be used to provide clips to any device which can interpret the metadata file and has access to the locations where the clips are stored. To give one example, the metadata file could be used to listen to songs on a device such as a cell phone; first, the user would download a metadata file containing clips specifying the songs to the cell phone, and the metadata file could then be used to search for and play the songs, with each song being downloaded as it is played.

TalkTV: FIGS. 1-5 talkTV is a set of tools designed to assist television fans in making fan vids. Television shows were digitized from broadcasts, VHS tapes, and DVDs into MPEG1 movie files of their video and audio content. The television shows all had closed captions, and the closed captions were parsed into pieces and the pieces used to segment the MPEG1 movie files. An XML file 101 was then produced in which there was a clip construct 107 for each piece of the closed caption and the in and out-points for the closed caption. Each digitized TV show was placed in a folder together with the XML file 101 for the video, as shown at 301. talkTV's set of tools includes the following:

A parser which segments a movie file and produces an XML file 101 with clip constructs referring to the segments;

A graphical editor which uses the XML file to locate segments from text in their closed captions, extracts segments, assembles them into a fan vid, and makes an XML file 101 for the new fan vid; and A video browser which uses the XML file 101 for the new fan vid to play the new fan vid.

The Parser

The parser component of talkTV produces XML file 101 as shown in flow chart 201 of FIG. 2. The flow chart starts at 203; at 205, the parser gets the video; it then executes loop 209 until the end of the video is reached (207), at which point the processing stops (211). The parser parses the closed captions for the video by looking for stop characters in the closed caption. A stop character is a character such as a period, question mark, or exclamation point that marks a stopping place in the dialog. The stop characters define pieces of the closed caption, with each piece being the portion of the closed caption between two stop characters. The start of the next piece of the closed caption is found at 213; then loop 218 is executed until a stop character is found. If one is found, the loop terminates (215); if not, the loop processes the next closed caption (216). The closed captions are related to locations in the video which are defined by elapsed time from the beginning of the video. The in point is the point of time in the video at which the caption appears on the screen; the out point is the point of time at which the caption disappears from the screen. The parser writes the piece of the closed caption and the in and out points for the piece to the clip construct 107 corresponding to the segment in the XML file (217). In this way, talkTV processing roughly segments the content of the video file at the boundaries where dialog exchanges take place.

It should be pointed out here that other techniques could be used for parsing the file; for example, the user could simply view the video and indicate segments which he or she found interesting, and the parser could make an XML file in which the clip structures indicated those segments. Other automatic techniques for finding in and out points include analyzing the audio track for silence or for breaks in certain frequencies. The techniques can also be combined; as will be seen below, in a preferred embodiment, the user is permitted to modify the in and out points found by the parser.

Figure 4:
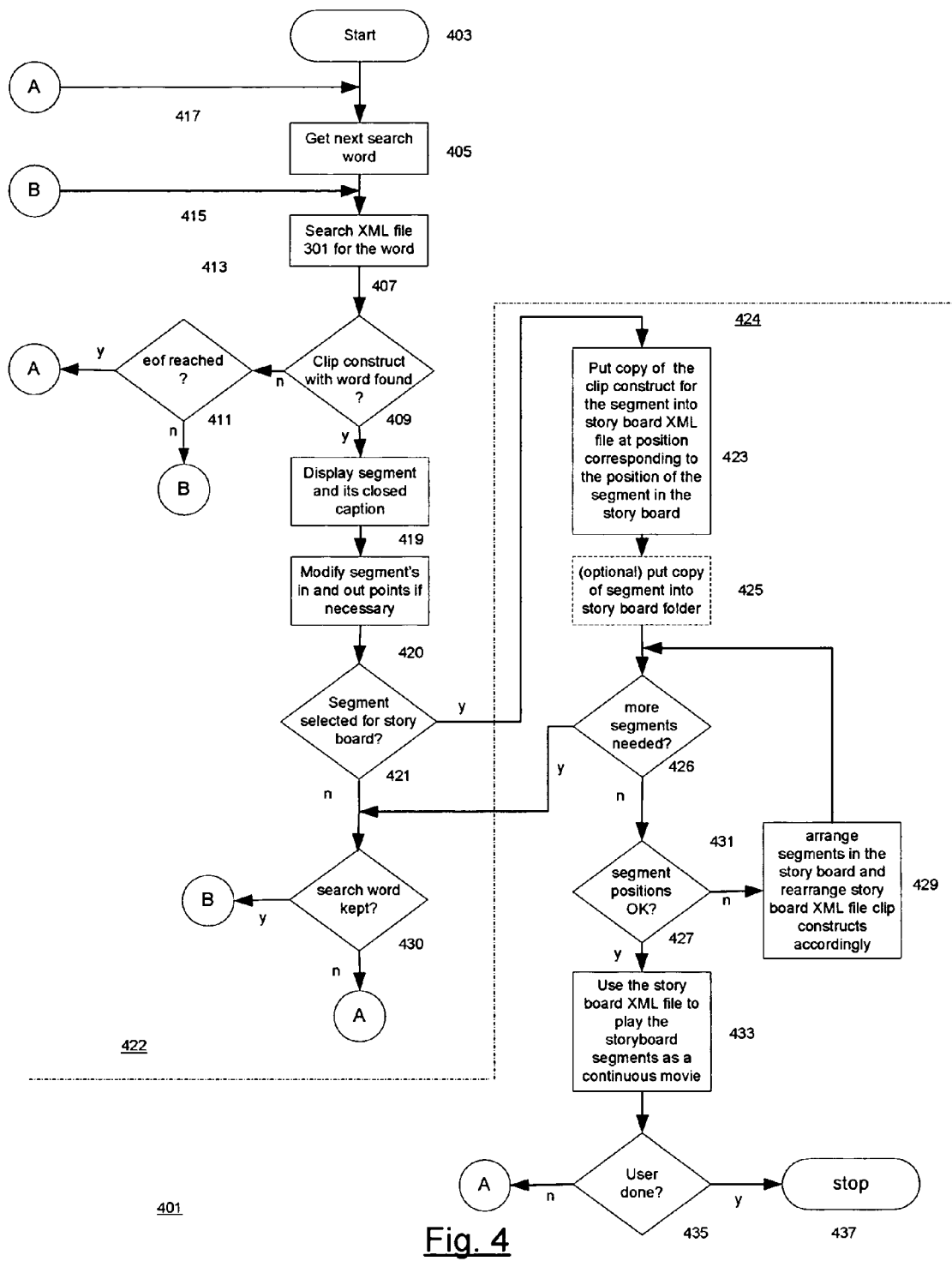
FIG. 4 is a flowchart of how video clips are located and rearranged.
Figure 5:
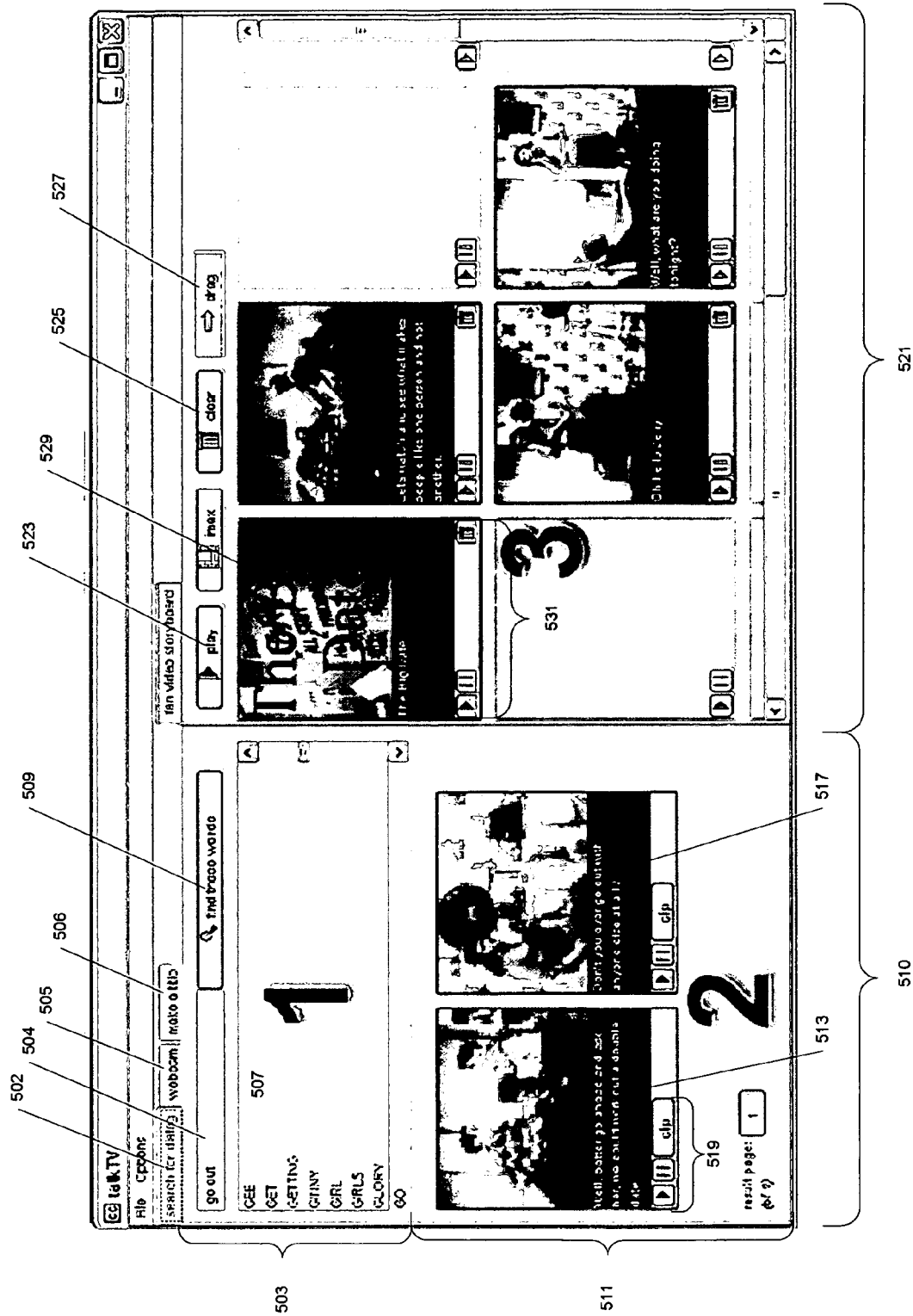
FIG. 5 shows a graphical user interface for locating and rearranging video clips.

The TalkTV Graphical Editor: FIGS. 4 and 5

When an XML file 101 is available for a video, it becomes possible to use XML file 101 to find segments of the video that have certain content. This is done by searching XML file 101's clip constructs for certain terms in the closed caption pieces and displaying the segment corresponding to a selected clip construct. Once this has been done, the clip construct can be copied to another XML file 101 which can be used to display the segment corresponding to the clip construct along with the segments corresponding to the other clip constructs in the other XML file 101 in the order determined by the order of the clip constructs in that file. Of course, since the new XML file 101 contains clip constructs, it is searchable in exactly the same way as the original XML file. While the above operations could all be done by applying a text-only document editor to the XML files 101, talkTV employs an editing GUI that was built in the spirit of web page editors such as Netscape Composer™, Microsoft FrontPage™, and Macromedia Dreamweaver™ which permit graphical manipulation of Web page layouts and thus help to ensure that "what you see is what you get".

FIG. 5 shows the graphical user interface (GUI) 501 for the talkTV editor. The GUI has two main parts: a clip making part 510 and a clip arranging part, or story board, 521. FIG. 4 is a flowchart that gives an overview of the operations which the GUI controls. The flowchart has two parts, indicated by a dashed line. Part 422 shows the operations performed by clip making part 510; part 424 shows the operations performed by story board 521. Beginning with part 422, at start 403, the user has specified a video which has an XML file 301 associated with it. The user specifies a search word (305) and the XML file 301 is searched for a clip construct that has the word (407). If such a clip construct is found (409), the segment specified in the clip construct and its closed caption are displayed. If no clip construct is found and the end of the XML file has been reached, the user must specify a new search word, as indicated by connector A; otherwise, the editor continues to search the XML file for a clip construct containing the search word, as indicated by connector B. The search can be done on any metadata contained in the XML file. For example, if there are more than one XML files and the metadata contained in the XML file includes the title of the video, the search may be made using the title of the video. The search can be further limited by properties that can be implied from the metadata. For example, if the user believes the desired segment is in a particular part of the video, the user can specify that the search only include that part (indicated, for example, in terms such as "first half" or "last quarter").

Once the user has found a clip construct for a segment, the user may modify the clip construct's in and out points if desired (420). In some embodiments, the user may also alter the metadata in the clip construct. Alterations included specifying additional metadata, such as the name of the speaker of the clip construct's closed caption part or the location at which the segment identified by the clip construct plays or modifying the closed caption part in the clip construct. In embodiments that permit the latter, the closed caption displayed in the clip comes from the clip construct. If the user wants to use the segment, he or she selects it for the story board (421); in the preferred embodiment, this is done by dragging the segment to story board 421.

Otherwise, the user either inputs a new search word or the search continues with the former search word (430).

If a segment has been selected for the story board, processing continues as indicated at 424. First the clip construct corresponding to the segment is placed in the story board's XML file 307 in a position corresponding to the segment's position in the story board (423). Then, a copy of the segment may optionally be put into the story board folder (425). If more segments are needed, the user is returned to part 422 (426); otherwise, if the user is not satisfied with the positions of the segments in the story board (427), he or she may rearrange them (429). As the user rearranges the segments in the story board, the talkTV editor makes corresponding rearrangements of the clip constructs in story board XML file 307. When everything is in order, the user indicates that the editor is to play the segments as a continuous movie. In a preferred embodiment, this is done by making the segments into a video file in which the segments have the order indicated in XML file 307. XML file 307 is then associated with the new video. XML file 307 can now be used to search, edit, or play the new video. If the user is done, he or she ends the program; otherwise, the user may begin collecting segments for the next video (435).

Details of the User Interface
Finding and Making Segments

The user employs clip making part 510 to find interesting segments in a video, to add titles to them, and to make his or her own segments using digital images produced by the user. Tabs for each of these possibilities are seen at 502, 505, and 506. The current tab is the one for finding interesting segments. This tab has two parts: a searching facility 503 and a segment display facility 511. Searching facility 503 permits the user to search for segments by the words in the closed caption pieces in the clip constructs associated with the segments. At 504, the user enters a word or phrase he or she wishes to find in the field and then clicks on button 509; at 507, the user may choose a word from a list of the words in the closed captions and then click on the word. When the user clicks on the word, talkTV searches XML file 301 for clip constructs whose closed caption pieces contain the word. talkTV then displays the segments specified by the clip constructs in display facility 511; as shown, segment 513 was located using the word "go" and segment 517 was located using the term "go out". Each segment also displays the closed caption piece with which it is associated in the clip construct.

The buttons at 519 permit the user to play the segment, stop its playing, and modify the in and out points for the segment. The latter is done using trimming options under the "clip" menu. Modification is often necessary because closed-captioned dialog is added as one of the final steps in the production cycle for a pre-produced program. Live broadcast closed captions are often rife with misspellings and are as a rule delayed by up to several seconds, but talkTV can use the trimming options to time shift these captions to account for the transcription delays.

Figure 14:
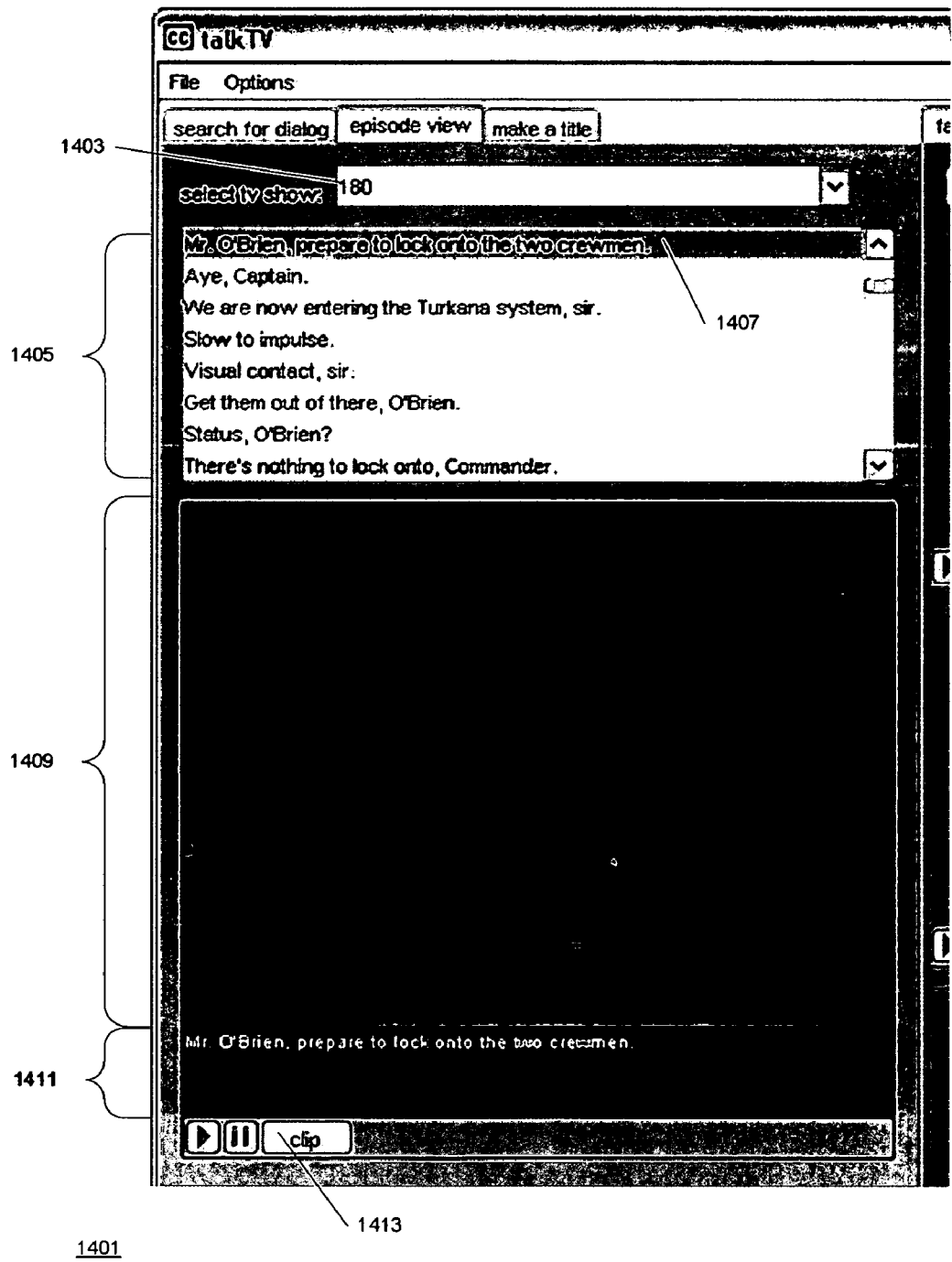
FIG. 14 shows an episode view GUI.

Using the "episode view" panel, television fans can also browse through the closed caption pieces of dialog of an individual television show to find segments. When a line of dialog is selected, the corresponding segment is displayed in display facility 511. The GUI 1401 for doing this is shown in FIG. 14. At 1403 is a drop-down list of episodes from which the user may select an episode; at 1405 is the list of closed caption pieces for the episode. Navigation through the list is by the scrollbar to the right. When the user selects a closed caption piece, as shown at 1417, talkTV uses the clip structure that contains the closed caption piece to locate the segment, which is displayed at 1409, with the closed caption piece at 1411. To trim the segment's in and out points, the user clicks on button 1413.

Television fans can use make a title tab 506 to create and insert titles (or interstitial text) into their projects. This is done by typing title text into a text field, and then previewing the text superimposed over pre-selected background video segments. The title becomes part of the metadata for the segment in the XML file. When the user selects webcamera tab 505, he or she can make segments from digital images that the user provides. Fans can use this feature to personalize a fan vid by inserting segments of themselves acting, establishing shots, props, or other events. The editor treats a segment made from a user-provided digital image in the same manner as one made from a video. Thus, a title may be added to a segment made from a user-provided digital image.

Combining Segments

Storyboard 521 makes an XML file corresponding to the current arrangement of the segments in storyboard 521. As the user adds, deletes, arranges, and rearranges segments, storyboard 521 automatically updates the XML file to reflect the changes. Storyboard 521 in a preferred embodiment is a grid which can display up to twenty-five individual segments. Using the mouse, television fans can drag video segments from segment selection part 510 to storyboard 521. A segment may come from a search on the XML file for a video, may have been made using the web camera, or may be a title segment. In the preferred embodiment, dropping a video segment onto the storyboard makes a copy of the video segment and also compresses the video segment into a smaller file. In other embodiments, copies may never be made or may be made only when the user indicates that a video file corresponding to the arrangement of segments currently on the story board is to be made. Buttons 531 permit each individual video segment in the story board to be played, stopped, and deleted. Video segments on the storyboard can be re-sequenced by dragging them to another location in the storyboard, or deleted by pressing the "delete" button for the segment clear button 525 removes all of the segments from the story board.

The Video Browser

When play button 523 is pushed, the video browser component of talkTV plays the storyboard's XML file. Because the XML file is constantly updated to reflect the current arrangement of the storyboard, the segments are played in the order specified by the story board. In the preferred embodiment, this is done by producing a new video file that contains the segments in the order specified by the XML file. In other embodiments, no new video file need be made. Using the XML file to play re-sequenced video segments is talkTV's equivalent to reloading an edited web page in a web browser.

Sharing the New Video and XML File

Fan videos made with talkTV can be saved as a Quicktime™ digital-video file into which the XML file has been embedded. If a fan video is e-mailed to another television fan, the fan can watch the video. If the other fan also has the talkTV application, he or she can import the video into his or her own collection of television shows Because the XML file is included, a fan with talkTV can do everything to the imported video that he or she can do to his or her own videos. To make it easy to send fan videos to other television fans, talkTV has a drag button 527 which makes it easy to drag the digital video file into other applications like e-mail and chat. Individual storyboard clips can also be dragged and copied into other applications. In other embodiments, only the XML file may be sent. Such embodiments are particularly useful where the media files that contain the segments are stored on servers and the XML file is played by retrieving the segments from the servers.

Using a Metadata Text File to Display Related Portions of Versions of a Work: FIGS. 6-10

Figure 6:
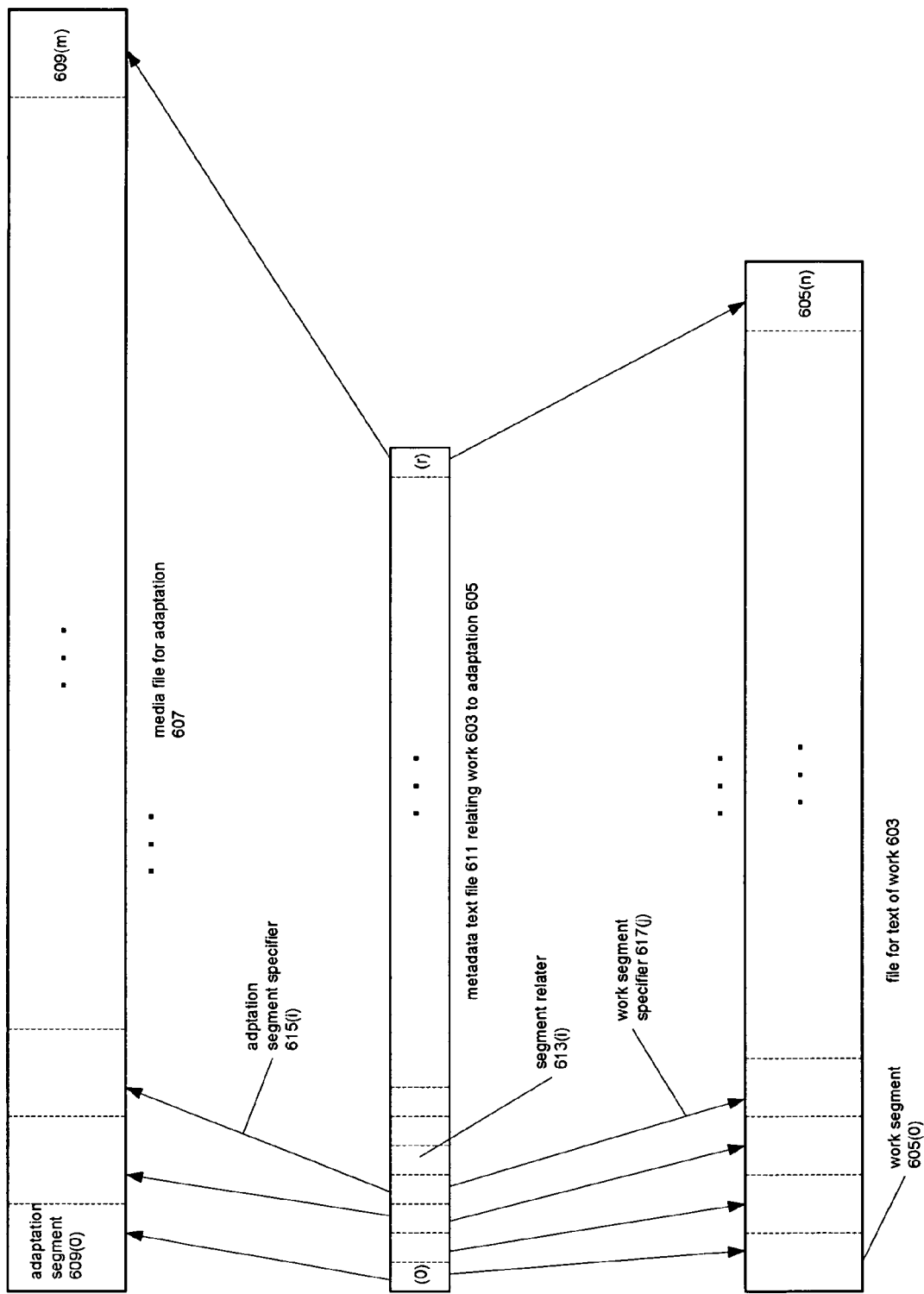
FIG. 6 shows a metadata text file which relates a media file to a text file of a work from which the movie represented by the media file was adapted.

In the TalkTV XML file 101, a relater relates an item of metadata to only a single segment; there is, however, no reason why the relater could not relate an item of metadata to more than one segment. One use for a metadata text file whose relaters relate an item of metadata to more than one segment is to compare versions of a work, for example, a novel and a film based on the novel. FIG. 6 shows how a metadata text file 611 can be used for this purpose. The set of files 601 consists of a file 603 for the text of the work the work, in this case a novel, a media file 607 for the movie version, and text metadata file 611. File 603 can be a text file or it can be an image of the novel. Both work file 603 and media file 607 have been segmented and the segments have been associated with labels, either by hand or automatically using techniques such as the ones used in connection with talkTV. In work file 603, the segmentation may be by page number and the labels may be text from the page or chapter and section headings. In media file 607, the segmentation is by in-and out points, and the labels may be parts of the closed captions, as previously explained, they may have been produced by speech recognition of the movie's dialog, or they may be assigned by the person making the segmentation.

Overview of Metadata Text File 611

Metadata text file 611 relates segments in work file 603 to segments in media file 607; at a minimum, metadata text file 611 establishes a one-way relationship between a segment in work file 603 and a corresponding segment, if any, in media file 607. There is thus a relater in metadata text file for every segment 605 in work file 603 and the relater relates the segment 605 of the work file 603 to which it belongs to the corresponding segment in media file 607. These relaters are termed in the following segment relaters. The segment relater thus makes a segment of work file 605 into metadata for a segment of media file 607 and vice-versa. The segment relater contains at a minimum a segment specifier 617 for segment 605 and a segment specifier 615 for the related segment 609 in media file 607. The segment specifier can take any form that is suitable for the file involved. For example, with a file that represents a text, the segment specifier can be page numbers for pages in the text, while in a video, the segment specifier can be in and out points. In a system that has files 603, 607, and 611 and the hardware and software to interpret these files, a reader of work 603 can use metadata text file 611 to go to the segment relater 613 for a particular page of work 603 and the system will display the page's text from file 603 and play the corresponding portion of the movie from file 607. The system thus permits a user to browse through the novel and view the corresponding parts of the movie as he or she does so. If, as is often the case, there is no segment in media file 607 that corresponds to a segment 605(i) in work file 603, the segment relater for segment 605(i) simply contains no adaptation segment specifier 615.

A metadata text file 611 may of course contain much other information in addition to the segment relaters. The information tends to fall broadly into two classes: global information that concerns the whole work, and segment information that concerns particular segments. Examples of global information include detailed bibliographical information concerning the work and the movie version, the number of pages in the book, and the length in time of the movie, information concerning the author of the book and the director and actors in the movie, or critical studies of the book, the movie, or the adaptation process. A segment relater may relate segments in one file to segments in more than one other file and file 611 may also contain multiple sets of segment relaters, one for each file being related to other files by metadata file 611. In the case of the two files of FIG. 6, there would be in addition to segment relaters 613 a second set of segment relaters that related each segment of media file 607 to its corresponding segment, if any, of work file 603. Such an arrangement would permit the user not only to browse through the work and see the corresponding segments of the movie, but also to browse through the movie and see the corresponding segments of the work. Metadata text file 611 may also of course contain segment relaters that relate more than two works. For example, a metadata text file 611 for the Lerner and Loewe musical My Fair Lady might include segment relaters for the Shaw play Pygmalion upon which the musical was based, for videos of one or more stage productions of the musical, and for the movie version of the musical.

A segment relater may contain segment information in addition to the segment specifiers. One important class of segment information is information which makes it possible to search metadata text files 611 to find segments of interest. One example of such search information is the closed caption pieces for the segments, which can be used as described above to find segment relaters that point to particular segments of the video file. Another is the names of the actors that appear in the segment. If a text that is being related to a media file is in the form of an image, a segment relater for a segment of the image could also include character codes for the characters in the text segment, which would make the whole text searchable by way of the metadata text file. Other information would involve the relationship between segments; for example, if a segment of the text work had no corresponding segment in the media file, the metadata text file 611 could contain a message indicating that fact. Additional information, such as an explanation by the film's director why that part of the novel was not included in the film might also be included.

Figure 7:
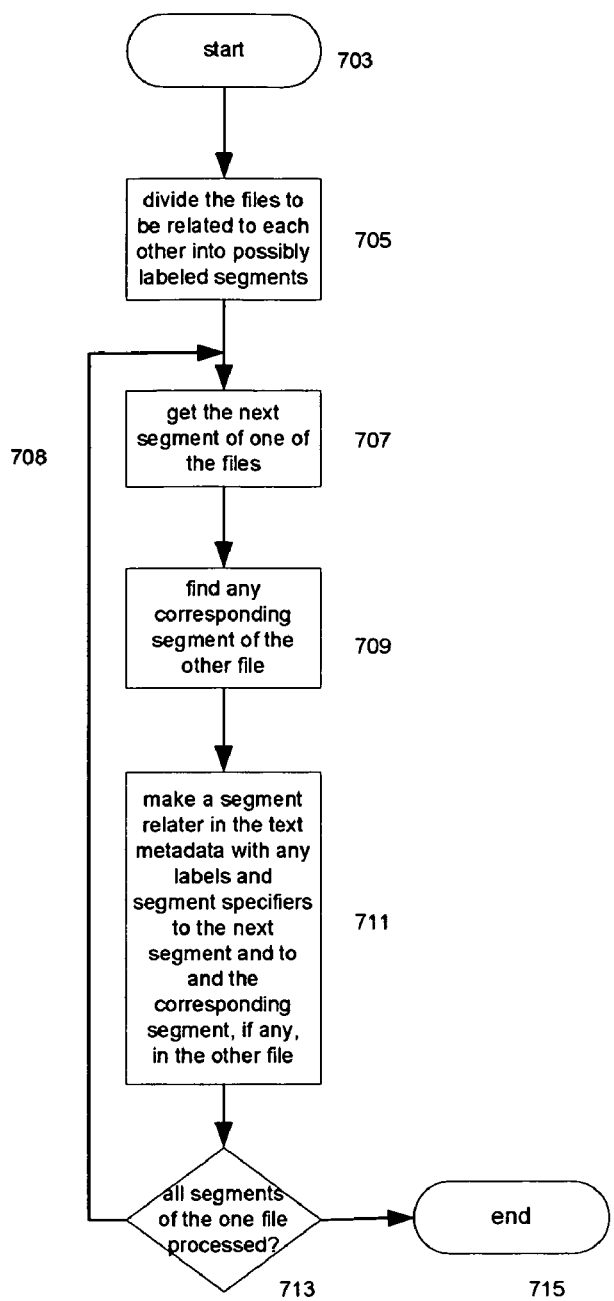
FIG. 7 is a flowchart of how the metadata text file of FIG. 6 is produced.

Making Metadata Text File 611: FIG. 7

FIG. 7 shows a method 701 for making a metadata text file. Beginning at start 703, the first step is to divide the files to be related into segments, which may be done by hand or by using automatic techniques such as the ones described above for talkTV. The remainder of the method describes what is done to relate one of a pair of files to the other file of the pair, but the method can easily be modified to relate a file to more than one other file and to mutually relate a set of files to each other by performing the method for each of the required relationships. The segments of one of the files are related to the segments of another of the files in loop 708. For the one file, each segment is taken in turn (707); then any corresponding segment is found in the other file (709). Then a segment relater is made with any labels, segment specifiers to the next segment of the one file, and to any corresponding segment in the other file (711). Processing continues until all segments of the one file have been processed (713), at which point loop 708 terminates.

The relating of the segments can be done either automatically or using a GUI. An automatic technique for relating segments of a movie to locations in the book from which the movie was made is the following: every piece of closed caption dialog is used as a search query into the text of the book; where a correspondence is found, a relater is made between the location in the book and the segment of the movie corresponding to the piece of closed caption. A technique using a GUI would have a user highlight text in the book and drag it along a timeline for the movie. As the text is dragged, the part of the movie corresponding to the current location on the timeline is shown, and when the proper part of the movie appears, the user drops the highlighted text and a relater is made relating the portion of the movie corresponding to the position at which the text was dropped on the timeline to the dragged text. Automatic and manual techniques may of course be combined; for example, the automatic technique may be used to obtain a rough relationship of segments of the movie to locations in the book and the rough relationship may be edited by hand.

Figure 8:
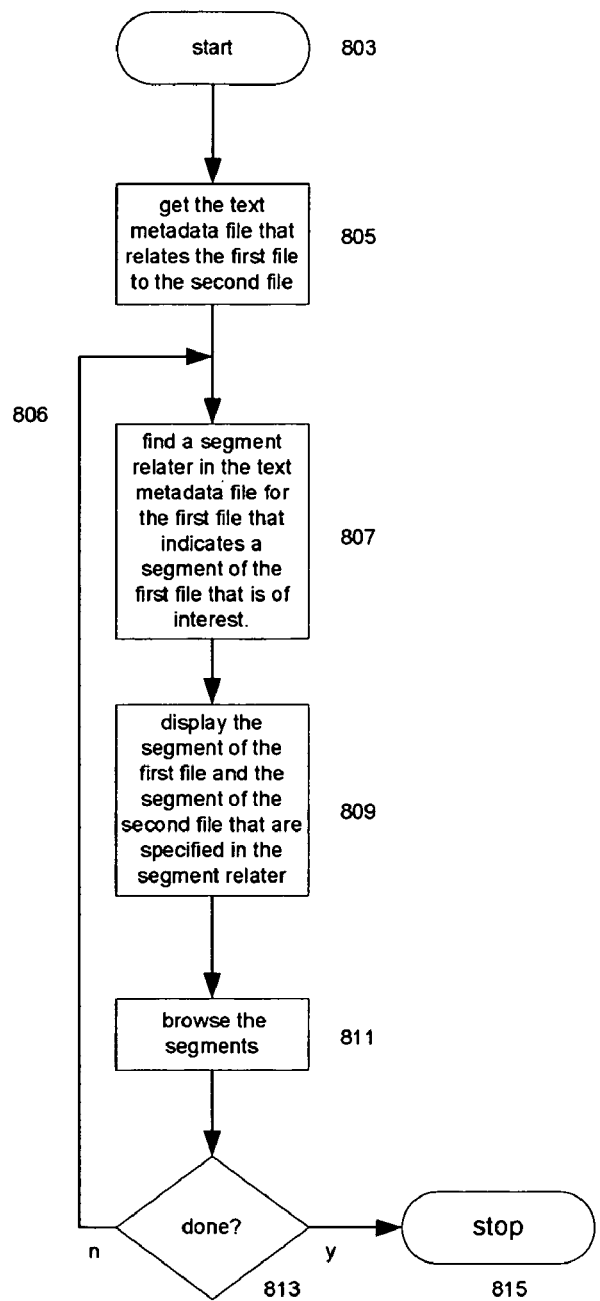
FIG. 8 is a flowchart of how the metadata text file of FIG. 6 is used to view the text and the media file.

Using Metadata Text File 611 to View a Pair of Files: FIG. 8

FIG. 8 shows a method 801 for using a metadata file 611 to view a file and another file to which the first file is related by metadata file 611; again, method 801 assumes a pair of files, but it could work with three or more files as well. Method 801 also assumes that the metadata file 611 only relates the first file of the pair to the second, and not vice-versa, but if the relationships are mutual, the method could be used with either file of the pair. Beginning at 803, the method first gets the text metadata file 611 that relates the first file to the second file (807). Then the user enters loop 806, whose execution continues until the user decides to quit. The first step in loop 806 is to use text metadata file 611 to find a segment relater for the first file that indicates a segment of the first file that is of interest (809). If the segment relaters contain searchable information, the segment relater can be found be searching the searchable information. Then the segment of the first file and the segment of the second file that are specified in the segment relater are displayed (811). Thereupon the user can browse the displayed segments (811). If the user is not done (813), loop 806 is again executed. The program ends at stop 815. The first and second files may be stored locally to metadata file 611 or may be stored on remote servers.

Figure 9:
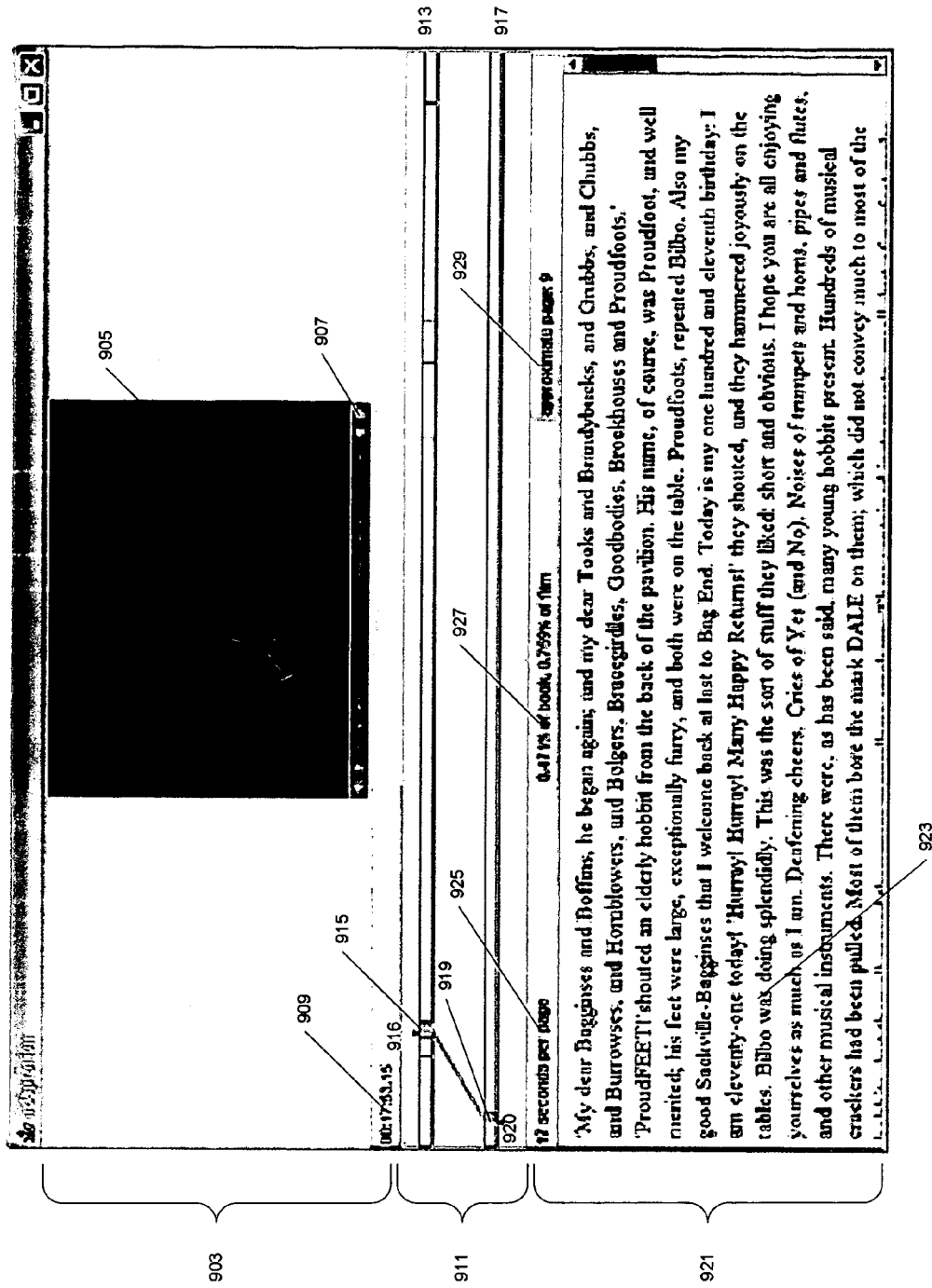
FIG. 9 shows a GUI used with the metadata file of FIG. 6.

A Graphical User Interface for Viewing Versions Related by a Metadata Text file 611: FIG. 9

FIG. 9 shows a graphical user interface 901 for practicing a variation on method 801 in which a text of which a video version has been made is contained in the text metadata file. The video file is a video file of the film, *The Fellowship of the Ring*, which is based on J. R. R. Tolkien's novel of the same name. The text metadata file contains the text of the novel. The segment of the text is the account of Bilbo Baggins' speech at his $111^{th}$ birthday party; the segment of the video file shows Bilbo giving the speech.

Graphical user interface 901 has three parts: a display 903 for a segment of the film, a display 921 for the corresponding segment of the text, and a relative position indicator 911 which shows the relative positions of the segment of the video file in the movie and of the corresponding segment in the text of the novel Beginning with position indicator 911, there are time lines for the text and the video file, with time line 913 being the time line for the video file and time line 917 being the time line for the text. The position of the current segment of the video file is indicated by marker 915 in time line 913, and the position of the current segment of the text is indicated by marker 919 in time line 917. Navigation along the time lines is by means of navigation points 916 and 920. When either of these is moved, the closest segment to the current position of the navigation point is indicated by the position marker for its time line and the other navigation point moves to the position of the corresponding segment in the text or video and the position marker for the text or video indicates the segment in the other that corresponds to the segment to which the first navigation point was moved. The segments indicated by the position markers are displayed at 903 and 921. This arrangement makes it possible for the user to navigate through the video by navigating through the text in the text metadata file and to navigate through the text by navigating through the video segments specified in the text metadata field. Effectively, the text has become metadata for the video and the video has become metadata for the text.

Display 903 displays current segment 905 of the video file. Bar 907 permits the user to navigate within the video file segment. Time display 909 indicates how far into the movie the segment occurs. Display 921 contains the corresponding segment 923 of the text of the novel. Scroll bar 917 permits the user to navigate within the text segment. The numbers at the top of display 921 indicate first, the number of pages in the text segment that corresponds to the video segment (929), and then statistics concerning the related segments. Thus, the statistic at 925 divides the length of time for the entire segment corresponding to Bilbo's speech in the movie by the number of pages given it in the novel to obtain a rough determination of how many seconds are given to each page. Statistic 927 divides the length of the text in the text metadata file by the length of the text segment to determine the percentage of the novel represented by the text segment and does the same with the length of the video segment and the total length of the movie to determine the percentage of the film represented by the video segment. In other embodiments, the text metadata file may include page numbers for the text as well as the total number of pages in the text.

The Metadata Text File for the GUI of FIG. 9: FIG. 10

FIG. 10 shows the metadata text file 1001 used to produce the display of video segments and text in GUI 901. Metadata text file 1001 is an XML file and contains a standard XML header at 1003. The metadata in metadata text file 1001 includes the entire text of Tolkien's *Lord of the Rings*. The XML construct for the entire book is shown at 1005; at its beginning 1006 are specified the number of pages in the book and its title. Book construct 1005 contains a chapter construct 1007 for each chapter in the book; here only parts of the first chapter are shown. At the beginning of chapter construct 1007, the chapter number and title are specified at 1008. Then comes the text of the chapter. Where there is a scene in the video that corresponds to the text of the chapter, an anchor construct 1009 is nested in chapter construct 1007. At the beginning 1010 of each anchor construct 1009 are the in point 101 1 and out point 1013 for the video segment. The remainder of the anchor construct contains the text that is related to the video segment. The anchor constructs are of course the segment relaters in this application.

With metadata text file 1001, browsing through the text of chapter 1 and seeing the related video segments is simply a matter of moving through the text. When an anchor construct is reached, the film segment related to the anchor construct is displayed. Browsing through the video and seeing the related pages of text is done by keeping track of the location at which the user is in the video and then searching for an anchor construct in text file 1001 for which the user's location in the video are within the anchor construct's in and out points. In the preferred embodiment, the time line positions are computed from the length of the video and the length of the text; in other embodiments, the metadata in the metadata text file may include page and chapter numbers in the text and the point in time relative to the entire video at which the segment begins.

Using Metadata Containing Information about External Events to Find Locations in Media Files: FIG. 11

Metadata text files are not limited to relating words in dialog or portions of text to locations in media files, but can be used to relate any kind of information that can be expressed in text form to locations in media files. This point is illustrated in the following example in which temperature and humidity readings from sensors are employed to find locations in a video that teaches cooking.

Scenario

Imagine the videotaping of a cooking show. The chef prepares a meal using special kitchen utensils such as pitchers rigged to sense if they are full of liquid, skillets that sense their temperature, and cookie cutters that sense when they are being stamped. All of these kitchen utensils transmit their sensor values to the video camera, where the readings are recorded to a metadata text file. The metadata text file synchronizes the sensor readings with the video in the same way that talkTV synchronizes the video with closed captions and that the adaptation application synchronized the portions of the text of the novel with corresponding scenes of the video.

When this show is packaged commercially, the metadata text file is included with the video for the show. The purchaser can watch this video in his or her own kitchen and follow along with the host to prepare a meal. The purchaser also has special kitchen utensils rigged with sensors, and the television in the purchaser's kitchen receives values transmitted by the sensors. The purchaser now need no longer fast-forwarding and rewind the video to re-cue a segment when he or she misses a step; instead, the video automatically jumps to the part of the tape which corresponds to the step which the purchaser is at in the recipe. This happens because the kitchen instruments' sensor values are used as search queries on the text metadata file to find places in the video with matching sensor data from the original broadcast. In this way, just pouring out a glass of iced tea could cue video of Julia Child saying, "After I pour myself some iced tea, I always add a lemon wedge!"

A user could assemble segments for a variety of recipes into a single text metadata file for the recipes for the courses of a complete meal as described above with regard to talkTV. Each relater in the text metadata file would relate a recipe name and sensor values to the segment Thus, the user could find out what to do next with regard to a specific course by specifying the recipe name for the course to the television. The television would respond to the recipe name by searching for a segment for the recipe that had the current sensor value and would then show the clip in the television.

Prototype Implementation

A kitchen pitcher was rigged with a water sensor and temperature sensor. These sensors transmitted their values via infrared to a computer where each value was time stamped and recorded to a text metadata file that was synchronized with the video and audio track. We used this system to record a cooking show in which we prepared iced tea. The recipe is simple: hot water is poured into the pitcher, ice cubes are added to cool down the tea, and then tall glasses of iced tea are poured out.

The pitcher can be used for search queries into this video. For example, when the pitcher is filled with hot water, the video jumps to that scene in the video. When the water in the pitcher cools, the video jumps to the scene just after the ice cubes were added. If the pitcher is emptied, two video segment search results are returned: one of the iced tea being poured out and another from the beginning of the show (both of these clips have the same sensor values: room temperature and no water).

Sensor data is continually streamed to the computer and the display of the video set to the portion corresponding to the current sensor data. In this way, one can work in the kitchen freely and the part of the video one needs is there on the screen when one turns to look at it.

The Metadata Text File for the Cooking Video: FIG. 11

FIG. 11 shows the metadata text file 1101 for the cooking video. It consists of a title construct and a sensor construct 1105 for each sensor employed. Each sensor contains a list of item constructs 1107. Each item construct 1107 relates a reading 1109 from the sensor construct's sensor to a location 111 in the video. Here, the location is expressed as seconds from the beginning. In this application, the item construct is the relater. In the example, the temperature and humidity increase throughout the cooking lesson, so no change in temperature or humidity means that any of the locations corresponding to a particular reading will do. In more complex cases, disambiguation may require taking into account the history of readings from the sensor or readings of several of the sensors. As indicated above, the item construct might include recipe metadata as well as sensor-generated metadata.

Other Applications of this Kind of Metadata

Sensor-generated metadata can be used in any application where a location in a media file or even a text file can be related to sensor information. One large area of application is in industry: when sensor data from an industrial process shows a problem, it can be used not only to set off an audio or visual alarm that alerts the operator of the process but also to reference the part of a video that shows the operator how to deal with the problem and display the relevant part of the video on the operator's console. Sensor-generated metadata could also be used in a non-emergency situation as a way of giving the operator information about what the current state of a sensor means. Of course, the information could be provided in any convenient form. It might, for example, be text. In situations where the operator needs to use his or her eyes to deal with the problem, the sensor data could be used to produce audio output, either by playing a segment from an audio file or by doing text-to-speech on a segment of a text file.

Figure 12:
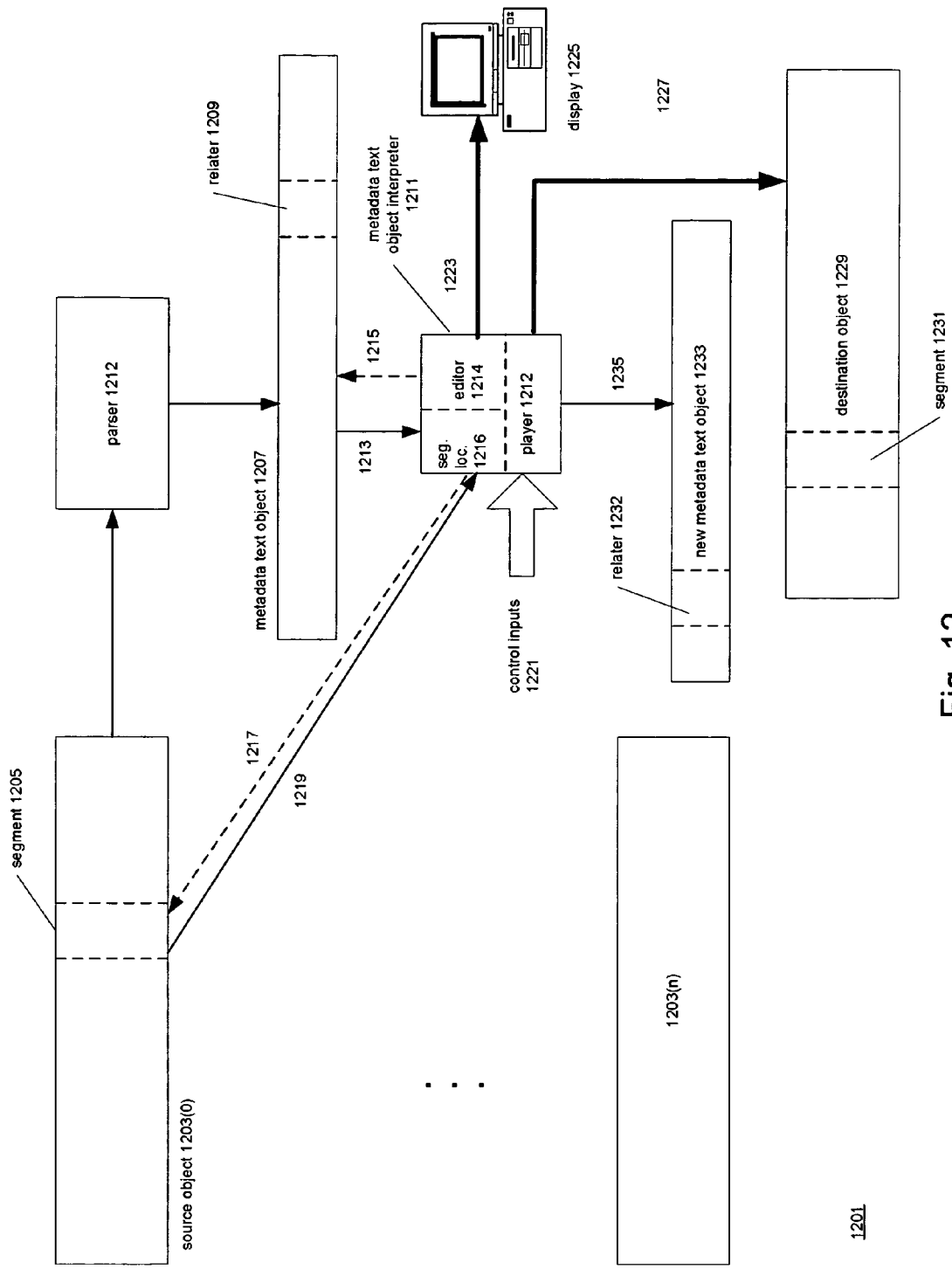
FIG. 12 is a schematic block diagram of a general system for using the metadata text files.

Generalizations: FIG. 12

FIG. 12 is a functional block diagram of a general system 1201 for using a metadata text object 1207 to produce a display 1225 or destination object 1229 from one or more source object 1203 and also to produce a new metadata text object 1233. The term object as employed here may be any kind of container for data. Objects include files of all types, object components such as tracks and headers, and entities such as the bit large objects (BLOBs) common in database systems. Source objects 1203 and destination object 1229 will in most cases be media objects, but may in fact be any kind of object in which a location can be specified, including text objects. One such location, segment 1205, is shown in source object 1203(0). Metadata text object 1207 includes a sequence of relaters 1209. Each relater 1209 relates an item of metadata to a location in a source object 1203(i). What the item of metadata is depends on the application system 1201 is being used for. Parser 1212 establishes the relationship between the item of metadata and the segment. Parser 1212 may establish the relationship by any means available, including automatic techniques, as in the cases of the talkTV and sensor applications, or hand techniques, as in the case of the adaptation application.

Metadata text object 1207 is interpreted by metadata text object interpreter 1211. Interpreter 1211 has three components which are of interest here: player 1212, which displays segments specified in relaters in display 1205, editor 1204, which can at a minimum arrange relaters in a metadata text file 1207, and segment locator 1216, which locates a relater 1209 of interest in metadata text file 1207 and then uses the relater to find the segment. Segment locator 1216 may locate the relater in response to selection inputs from a user or in response to a search of the relaters for an item of metadata. These components operate in response to control inputs 1221, which may come from any source, including a user or sensors. Typically, metadata text object interpreter 1211 uses segment locator 1216 to find a relater 1209 that contains the metadata required by the control inputs (1215). Having found the relater, segment locator retrieves the source object location specified in the relater (1213) and uses the location (1217) to fetch the contents of the location (1219) to interpreter 1211.

What happens next depends on what is to be done with the contents of the location. If it is to be used to make a new text metadata object 1223 containing a relater for the location, the interpreter displays the contents of the location and the user decides whether a relater for the location is to be included in the new text metadata object and where, as discussed with regard to talkTV (1235). If metadata text object interpreter 1211 is also assembling a destination object 1229 corresponding to new text metadata object 1223 from the contents of locations from the source objects, metadata text object interpreter 1211 puts the fetched contents into the proper location in destination object 1229.

Thus, segment 1205 from source object 1203(0) is placed in destination object 1229 as segment 1231 and a relater for the segment is placed in the corresponding position in new media text object 1233. If metadata text object interpreter 1211 is playing a metadata text object 1207, segment locator 1216 will read the relaters in the order in which they occur in object 1207 and provide the locations of the segments in turn to player 1212, which will, fetch each location from its source object, and display it in display 1225. Metadata text object interpreter 1211 may of course interpret new metadata text object 1233 in exactly the same fashion as described above for metadata text object 1209. Display device 1225 may be any kind of output device, including a video display or an audio output device.

An interesting property of system 1213 when it is used with display 1225 is that system 1201 makes it possible for users who have legal copies of sources objects 1203 to produce output to display 1225 that has been edited from one or more source objects 1203 without infringing any copyrights in the source objects. The reason for that is the following: as long as metadata text object 1207 does not itself contain expression from any of the source objects, it is not a derivative work of the source objects. Since all metadata text object interpreter 1221 is doing with the information from metadata text object 1207 is reading locations from source objects 1203 and displaying them in display 1225, it is making no copies of source objects 1203 and therefore not infringing any copyrights in the source objects. Of course, destination object 1229 does contain copies of segments from source objects 1203, and making a destination object 1229 without permission of the copyright owners of source objects 1203 would constitute copyright infringement.

Since a metadata text object renders a source object queryable by the metadata and further permits source object editing to the extent of determining what parts of the source object are displayed and in what order without infringing the copyright in the source object, distributors of source objects may want to include text metadata objects for various kinds of metadata with their source object and give users the right to edit the text metadata objects. Manufacturers of display devices such as DVD players may want to include a simple metadata text object interpreter with the player that is controllable, for example, by the remote that controls the player. One example of an area in which such a combination would be useful is classroom use of movies. Many movies which would otherwise be completely suitable for classroom use are rendered unsuitable by one or two scenes that contain gratuitous sex or violence. Teachers have traditionally dealt with this problem by previewing the movies, noting where the scenes were, and blocking the students' view of the display during the scene. A metadata text object like the ones used in the talkTV system would provide a more elegant solution to this problem, since all the teacher would have to do to get rid of the offending scenes is edit the metadata text object to remove the relaters for the offending scenes. When the metadata text object is then used to play the movie, the offending scenes will simply not be shown. Editing could of course be automated; for example, there could be a preview mode of viewing the movie in which a delete button that was controllable by the remote could appear; if the teacher clicked on the delete button, the relater for the scene would be removed from the metadata text object.

Conclusion

The foregoing Detailed Description has set forth to those skilled in the relevant technologies how to make and use the inventions disclosed therein and has further disclosed the best mode presently known to the inventor of implementing those inventions. As will be immediately apparent to those skilled in the relevant technologies, the principles of the invention have many applications in addition to the ones disclosed in the Detailed Description and may be implemented in many ways other than the ones disclosed there. For example, the metadata text object may be any object in which relaters can be expressed in textual form and the objects to which the segment specifiers refer may be any kind of objects whatever. The relater may have any form which relates an item of metadata to a segment specifier. The exact form of a segment specifier will depend on the kind of source object to which the segment belongs and the exact form of the metadata will depend on the kind of source object and the kind of application the invention is being used for. In some applications, the fact that associating a metadata text object with another object makes the other object searchable is the most important aspect of the invention; in others, it will be the fact that the metadata text object determines the order in which the segments of the source objects are displayed; in still others, it will be the fact that the invention makes it possible to use a segment of one source object as metadata for a segment of another source object. Various combinations of these aspects of the invention are of course also possible.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A text object used by an application that manipulates segments of one or more other objects, the text object and the other objects being stored in memory accessible to a processor, the text object being used when the processor is executing the application to manipulate the segments, and the text object comprising:
    a sequence of relaters, a relater including
        a first portion that is a segment locator that locates a segment of the segments; and
        a second portion that is an application metadata value, the application metadata value being neither an identifier for the relater in the text object nor belonging to a class of metadata values whose values are metadata values in the segment, the application metadata value being related by the application to the segment located by the first portion and
    the processor manipulating a segment of the segments when executing the application by responding, to the relater's application metadata value by locating the segment using the relater's segment locator and manipulating, the located segment as required by the application.

2. The text object set forth in claim 1 wherein:
    the relaters are XML constructs in the text object 3. The text object set forth in any one of claims 1 or 2 wherein:
    the processor selects the relater to be responded to by searching the text object for the relater's application metadata value.

4. The text object set forth in any one of claims 1 or 2 wherein:
    the processor further has access to a display device; and
    the processor manipulates the segment located using the segment locator by displaying the located segment.

5. The text object set forth in any one of claims 1 or 2 wherein:
    the processor further has access to a display device; and
    the processor manipulates the segment by altering the order of the sequence of relaters in the text object,
        the processor displaying the segments in an order corresponding to the altered order of the sequence of relaters.

6. The text object set forth in any one of claims 1 or 2 wherein:
    the other objects are accessible to the processor via a network.

7. The text object set forth in claim 6 wherein:
    the other objects are stored in servers in the network.

8. The text object set forth in any one of claims 1 or 2 wherein:
    the other objects are media objects; and
    the segment locator in the relater uses an in point and an out point in one of the media objects to specify the segment.

9. The text object set forth in any one of claims 1 or 2 wherein:
    the other objects have a text related thereto;
    the text object includes the text;
    the application metadata value is a portion of the text; and
    the segment corresponds to the portion of the text.

10. The text object set forth in claim 9 wherein:
    the other objects are media objects.

11. The text object set forth in any one of claims 1 or 2 wherein:
    a set of values is related to the segments;
    the application metadata value in the relater is a value in the set thereof; and the segment specifier specifies the segment that is related to the value.

12. The text object set forth in claim 11 wherein:
    the segments relate to stages in a process that is monitored by instruments; and
    the application metadata values are values that may be recorded by the instruments.

13. A memory device that is readable by a processor, the memory device being characterized in that:
    the memory device contains the text object set forth in any one of claims 1 or 2.

14. The text object set forth in any one of claims 1 or 2 wherein:
    the processor further manipulates the segments according to an order of the relaters in the sequence.

15. The text object set forth in claim 14 wherein:
    the order of the relaters in the sequence is determined at least in part by the application metadata of the relaters.

16. A method of making a text object used by an application that manipulates segments of one or more other objects, the text object being stored in a memory accessible to a processor for an application to be executed by the processor, the text object including one or more relaters, a relater relating an application metadata value to a segment of an object and having a first portion which is the application metadata value and a second portion that is a segment locator that locates the segment, the method comprising the steps performed by the processor, the processor being programmed to perform the steps, of:
obtaining an application metadata value, the application metadata value being neither an identifier for the relater in the text object nor belonging to a class of metadata values whose values are metadata values in the segment;
obtaining a location in the object of the segment that the application relates to the application metadata value;
making a relater in which the relater's first portion represents the location and the relater's second portion represents the application metadata value; and
placing the relater in the text object.

17. The method of claim 16, wherein:
the relater is one of a sequence thereof in the text object.

18. A method of viewing a first version and a second version of a work, a segment of the first version being related to a segment of the second version by a relater, the relater being included in a text object stored in a memory accessible to a processor,
the method comprising the steps performed by the processor, the processor being programmed to perform the steps, of:
obtaining the text object;
finding the relater in the text object; and
displaying the segment of the first version and the segment of the second version that are related by the relater in a display that is accessible to the processor.

19. Apparatus that permits an application to manipulate segments of one or more objects stored in memory, the apparatus including a processor that executes the application and has access to the memory and
the apparatus comprising:
a text object for the application stored in the memory, the text object including a sequence of relaters, a relater including a first portion that is a segment locator and a second portion that is an application metadata value, the application metadata value being neither an identifier for the relater in the text object nor belonging to a class of metadata values whose values are metadata values in the segment, the application metadata value being related by the application to a content of the segment located by the first portion; and
in the course of executing the application, the processor locates a relater according, to the relater's application metadata value and manipulates the located segment as required by the application.

20. The apparatus set forth in claim 19 wherein:
the relaters are XML constructs in the text object.

21. The apparatus set forth in any one of claims 19 or 20 wherein:
the application receives a search value and applies the search value to the application metadata values to locate the relater.

22. The apparatus set forth in any one of claims 19 or 20 wherein:
the apparatus further includes a display device to which the processor has access; and
the application execution responds to an application metadata value selection input by displaying a selected metadata value together with its associated segment in the display device.

23. The apparatus set forth in claim 22 wherein:
the selected application metadata value is from a first version of a work; and
the associated segment is from a second version of the work.

24. The apparatus set forth in claim 22 wherein:
a user makes the application metadata value selection input by selecting a relater from a representation of the sequence of relaters in the display.

25. The apparatus set forth in claim 24 wherein:
the representation of the sequence of relaters is a line wherein a position in the line corresponds to a relater in the sequence.

26. The apparatus set forth in any one of claims 19 or 20 wherein:
the relater relates the application metadata value to more than one segment; and
the application execution displays the segments associated with the relater together in the display device.

27. A memory device that is readable by a processor, the memory device being characterized in that:
the memory device contains code which, when executed by the processor, implements the apparatus set forth in any one of claims 19 or 20.

28. The text object set forth in claim 19 wherein:
the relaters are XML constructs in the text object.

29. A memory device that is readable by a processor, the memory device being characterized in that:
the memory device contains the text object set forth in any one of claims 19 or 28.

30. Apparatus that permits an application to display segments of at least two other objects, the other objects being stored in memory accessible to a processor, and
the apparatus comprising:
a text object for the application stored in the memory, the text object including a sequence of relaters, a relater including
a first portion that is a first segment locator that locates a segment of the segments in one of the at least two other objects; and
a second portion that is another segment locator that locates a segment in another of the at least two other objects;
the processor manipulating a segment of the segments when executing the application by locating the segment in the one of the at least two other objects using the first segment locator and/or the segment in the other of that least two other objects using the second segment locator and manipulating the located segment as required by the application, whereby the relater relates the segment and the other segment to each other.

31. The apparatus set forth in claim 30 wherein:
the apparatus further includes to display device to which the processor has access; and
the application execution simultaneously displays the segment in the one object and the segment in the other object in the display device.

32. The apparatus set forth in claim 31 wherein:
the one object is a first version of a work; and
the other object is from a second version of the work.

33. A memory device that is readable by a processor, the memory device being characterized in that:
the memory device contains the text object set forth in claim 30.

34. Apparatus that permits an application to relate a text work to a video work derived therefrom and to manipulate the text work and/or the video work, there being a digital representation of the video work in a digital memory and the digital representation being divided into segments, the apparatus including a processor that executes the application and has access to the digital memory and to a display device and the apparatus being characterized by:

a digital text object stored in the memory, the text object including the text of the text work and segment locators located in the text, a segment locator specifying a segment of the digital representation of the video work that is related to the portion of the digital text object in which the segment locator is located, and in the course of executing the application, the processor encounters the segment locator in the text and displays the text that contains the segment locator simultaneously with the segment specified by the segment locator.

35. A memory device that is readable by a processor, the memory device being characterized in that:

the memory device contains the text object set forth in claim 34.

\* \* \* \* \*